Feb. 27, 1945. A. BOYNTON 2,370,139
PRESSURE REGULATER, TEMPERATURE RESISTANT
Filed Aug. 27, 1941
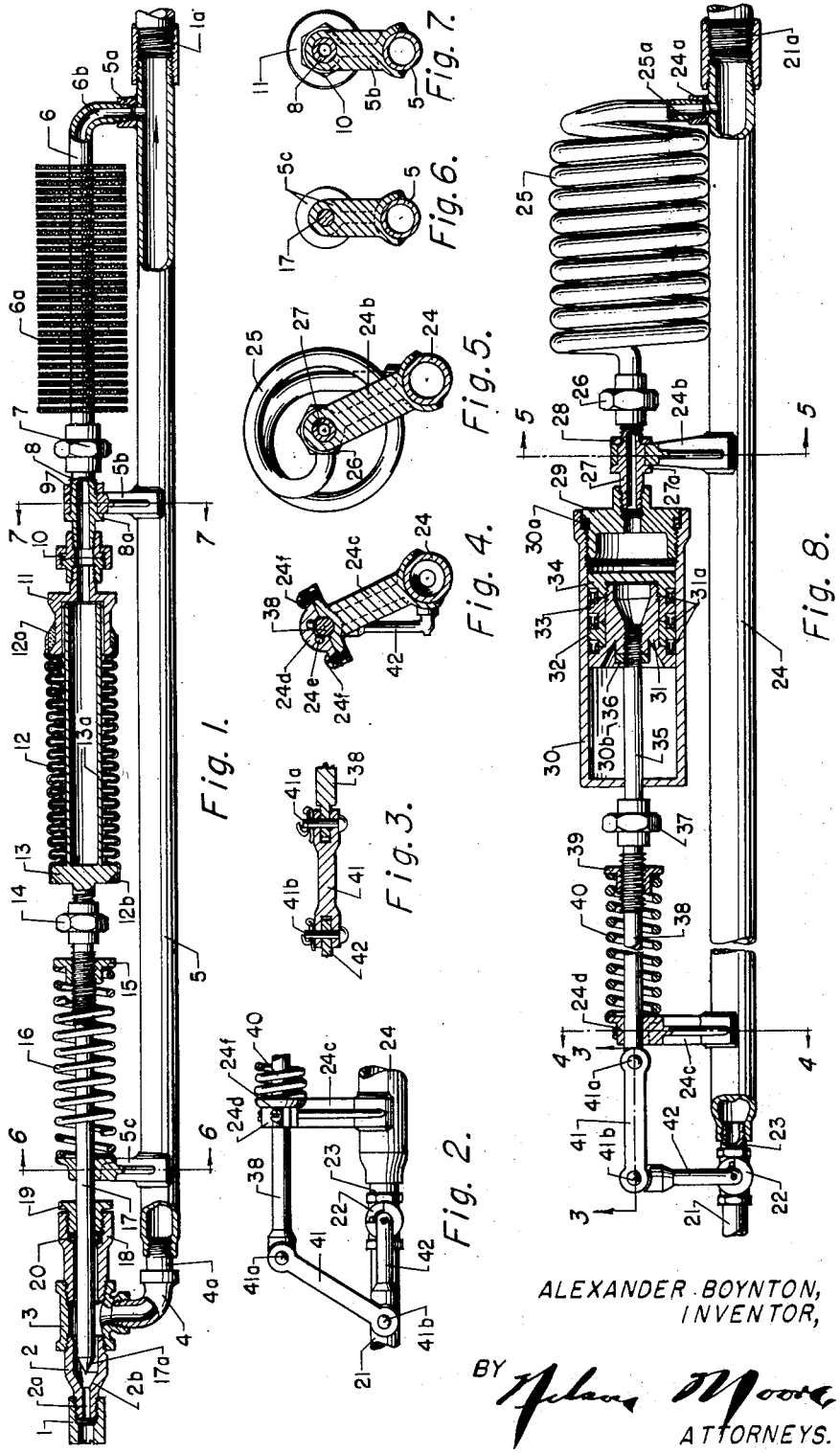
ALEXANDER BOYNTON,
INVENTOR,
BY *Nelson Moore*
ATTORNEYS.

Patented Feb. 27, 1945

2,370,139

UNITED STATES PATENT OFFICE 2,370,139

PRESSURE REGULATOR, TEMPERATURE RESISTANT

Alexander Boynton, San Antonio, Tex.; Sida S. Martin executrix of said Alexander Boynton, deceased Application August 27, 1941, Serial No. 408,523

10 Claims. (Cl. 50—23)

My invention relates to pressure regulators.

The principal object is to provide a pressure regulator having all working parts, except the valve, outside the path of flow through it, in order to prevent abrasive and/or corrosive substances in the regulated fluid from damaging the parts.

Another object is to provide for easy inspection of the working parts and for quick and easy replacements of the same.

Another object is to prevent temperature changes within the regulator from interfering with the operation thereof.

Another object is to prevent extremely high or low temperatures inside or outside of the regulator from damaging the working parts.

A further object is to provide a minimum of difference between the temperature of the atmosphere and that of the fluid employed to operate the moving parts.

In carrying out the invention, I employ a metallic bellows or a piston within a cylinder to actuate a valve to control the flow of the fluid from the high pressure line to the low pressure line, pressure from the latter line being employed to lengthen the bellows or to move the piston. A spring, which may have its force adjusted, affords means for adjusting the regulator so as to vary the pressure to be maintained within the low pressure line, all of which will appear more fully from the following specification and the accompanying drawing, in which—

Fig. 1 is mainly a side view of the preferred embodiment of the regulator assembly, partly in longitudinal section.

Fig. 2 is an outside view of the valve operating mechanism in Fig. 8, showing the valve wide open.

Fig. 3 is a longitudinal section on the line 3—3, Fig. 8.

Fig. 4 is a cross section on the line 4—4, Fig. 8.

Fig. 5 is a cross section on the line 5—5, Fig. 8.

Fig. 6 is a cross section on the line 6—6, Fig. 1.

Fig. 7 is a cross section on the line 7—7, Fig. 1.

Fig. 8 is mainly a side view of a modified construction, some of the parts being in longitudinal section.

In Fig. 1, the high pressure supply conduit 1 is shown connected to the low pressure discharge conduit 1a by the valve seat nipple 2, the T fitting 3, the street elbow 4, the nipple 4a, and the base tube 5.

The brackets 5b and 5c, both of which may be welded upon the base tube 5, support the pressure tube 6, the bellows 12, and the valve rod 17 aligned with the high pressure conduit 1 and parallel to the base tube 5, as appears, the valve 17a formed upon the rod 17 being in spaced relation to its seat 2b formed around the passage 2a which communicates with the high pressure conduit 1.

The bellows 12 has one end closed hermetically by the connection 11 and the solder or weld 12a, the other end of the bellows being similarly closed by the connection 13 and the solder or weld 12b. The bellows end connection 13 has the tubular extension 13a slidable within the bellows and within the bellows end connection 11.

The tube 6, having upon its longer straight portion the radiator discs 6a, has one end bent and connected to the boss 5a of the base tube, and has its other end joined to the nipple 8 by means of the union 7. The union 10 is employed to join the nipple 8 with the connection 11, the passage 6b communicating between the interior of the bellows and the interior of the base tube 5. The bracket 5b has an opening through which the nipple 8 is received closely, this nipple having the flange 8a which may be locked against the bracket by the nut 9.

The valve rod 17, extending through the extension nipple 18 and the T fitting 3, is secured to an extension of the connection 13 by the union 14 and is slidable through an opening transverse of the bracket 5c. The packing 20, compressed by the gland 19, serves to prevent fluid in the conduit 1 from leaking out around the rod. The nipple 2, the fitting 3 and the nipple 18 constitute an extension of the high pressure conduit 1, as is apparent.

The coiled spring 16 around the rod 17 is impinged between the bracket 5c and the spring adjusting support 15 threadedly engaged over the rod for the purpose of adjusting the compression force of the spring.

Operation, Fig. 1

Some of the fluid under pressure passing out of the high pressure conduit 1 into the base tube 5 will enter the bellows 12 via the passage 6b and tend to stretch it. At a predetermined force within the bellows, it will elongate and compress the spring 16 far enough to seat the valve 17a upon the seat 2b, thereby closing the passage 2a. The bellows will shorten again when the pressure within it decreases to a predetermined value. In this manner, a constant pressure of lesser value than that obtaining within the high pressure conduit 1 may be maintained within the low pressure conduit 1a.

To increase the discharge pressure, turn the adjusting support 15 so as to further compress the spring 16. Turning the adjusting support in the opposite direction, of course, will decrease the discharge pressure.

The unions 10 and 14 provide that the bellows may be replaced quickly. The radiator discs 6a will tend to maintain an even atmospheric temperature within the bellows.

If the regulator should be installed in the horizontal position, the base tube 5 may be turned so as to have the radiator discs 6a above it or below it in order to provide for more efficient cooling or heating within the bellows, as the case may require. If it is desired to reduce the temperature within the bellows, the radiator discs should be below the base tube. To increase the temperature within the bellows, install the regulator with the discs above this tube.

In the modified construction illustrated in Fig. 8, the high pressure supply conduit 21 has connection with the low pressure discharge conduit 21a through the intermediate connections consisting of the valve 22, which may be of the stop cock or plug valve type, the nipple 23, and the base tube 24, having the boss 24a, and the brackets 24b and 24c.

The cylinder 30 has one end capped by the closure plate 29, engaging the packing 30a and having a boss connected to the nipple 27 which is received closely through an opening transverse of the bracket 24b, the flange 27a of the nipple 27 being locked firmly against the bracket 24b by the nut 28 in order to rigidly secure the cylinder 30 parallel to the base tube 24.

The pressure coil 25 has one end secured within the boss 24a and has its other end connected with the nipple 27 by means of the union 26. The passage 25a leads from the passage through the base tube 24 into the cylinder 30, within which cylinder the piston assembly, consisting of the piston head 31, the leather or fabric U cups 31a, the cup spacer rings 32 and 33, and the cup retainer ring 34, is slidable. The U cups, fitted within peripheral recesses of the piston assembly, face toward the passage 25a and are spaced apart by the rings 32 and 33 which are secured by the threaded connection between the piston head 31 and retainer ring 34. The chamber 30b within the cylinder 30 may be filled partially with a lubricant to lubricate the piston assembly.

The rod 35, axially connected to the piston head 31 and secured by the lock nut 36, extends through the end of the cylinder and has connection with the rod 38 by means of the union 37. The rocker arm 41 has clevis connection with the valve operating arm 42 by means of the hinge pin 41b and has similar connection to the rod 38 by means of the hinge pin 41a. The coiled spring 40, surrounding the rod 38 and having one end contacting the bracket 24c and the cap 24d, may have its compression force adjusted by the spring support 39 which is engaged threadedly over the rod. This spring predetermines the force necessary to be exerted upon the piston assembly in order to close the valve 22.

The bracket cap 24d is secured upon the bracket 24c by the screws 24f, the rod 38 being slidable through an opening between the bracket and the cap where the balls 24e are let into the cap and protrude from it far enough to form a bearing for the rod 38 as it is urged against the balls when it moves the valve operating arm 42 in opening the valve 22.

Operation of Fig. 8

The valve 22, assumed to be open in the position shown in Fig. 8, will be closed gradually by pressure in the base tube 24 acting upon the piston assembly via the passage 25a. As this pressure rises, the piston assembly will be forced toward the valve operating arm 42, compressing the spring 40, and, at a predetermined pressure within the tube 24 and the conduit 21a, this arm will close the valve, as is illustrated in Fig. 2.

The coil 25 will tend to provide atmospheric temperature within the cylinder 30. If the temperature within the low pressure conduit 21a is above that of the atmosphere, the coil 25 will tend to decrease it and vice versa.

It is obvious that many mechanical changes, substitutions, and adaptations may be made in the construction and that equivalents may be substituted for the parts shown; and I reserve the right to make such mechanical changes, substitutions, and adaptations within the scope of the invention as herein disclosed and illustrated.

I claim:

1. In a temperature resistant pressure regulator: a high pressure and a low pressure conduit; a base tube having connections with said conduits; a pair of brackets on said tube; a nipple secured upon the first of said brackets; a valve rod slidable through the second of said brackets and through packing sealing said rod hermetically within said high pressure conduit; a valve on said rod, said valve being engageable with a valve seat between said base tube and said high pressure conduit; first and second bellows end connections, said first connection having a tubular extension; a bellows having one end hermetically joined to said first end connection and slidable over said extension to limit the compression of said bellows, the other end of said bellows being hermetically joined to said second connection; a pressure tube connected to said nipple and to said base tube, heat radiator means surrounding said tube; a spring normally compressing said bellows and urging said valve away from said seat; and means for adjusting the force of said spring.

2. In a pressure regulator: low and high pressure conduits; a base tube connected to said low pressure conduit and to said high pressure conduit, said last conduit having a valve seat surrounding the passage therethrough and an extension nipple thereon; a bellows having opposite end connections hermetically sealed therewith, one of said connections having a tubular extension within said bellows to limit the compression thereof, and the other said connection having tubular means communicating between the interior of said bellows and said base tube; a valve rod connected to said one connection, said rod being slidable within the extension nipple of said high pressure conduit; packing means within said extension nipple, said means being engageable with said rod; a valve on said rod, said valve being in spaced relation to said seat and adapted to close said passage through said high pressure conduit when a predetermined fluid force from said base tube is exerted within said bellows; a spring acting to compress said bellows and urge said valve away from said seat; means for adjusting the force of said spring; and means mounting said rod, said bellows, said spring, and said force-adjusting means on said base tube.

3. In a temperature resistant pressure regulator: a high pressure conduit having a tubular extension with a valve seat surrounding the passage therethrough; a base tube connected to said extension; a pressure tube connected to said base tube and in spaced relation to said high pressure conduit; a valve rod having a valve formed on the end thereof, said valve being engageable with said seat to close said passage; a bellows having one end hermetically sealed and joined to the other end of said rod, the other end of said bellows having hermetic connection with a tubular member connected to said pressure tube; a spring on said rod, said spring acting to compress said bellows and space said valve from said seat; means for adjusting the force of said spring; means for limiting the compression of said bellows; and heat exchange means on said pressure tube, the axes of said valve seat, said valve, said valve rod, and said heat exchange means being in alignment and positioned parallel to and adjacent one side of said base tube.

4. In a temperature resistant pressure regulator: a high pressure conduit and a low pressure conduit; a base tube connected between said conduits; a valve controlling the flow of fluid from said high pressure conduit into said base tube; a pressure responsive element connected to said valve to operate said valve by force of fluid in a conduit communicating between said pressure responsive element and said base tube and means on said communicating conduit controlling the temperature thereof, said means lying along and adjacent one side of said base tube.

5. In a temperature resistant pressure regulator: a high pressure conduit and a low pressure conduit; a base tube connected between said conduits; a valve in said high pressure conduit, said valve controlling the flow of fluid from said high pressure conduit into said base tube; a pressure responsive element operatively connected to said valve and constructed and arranged to be actuated by the pressure of fluid in said base tube and heat exchange means associated with said pressure responsive element and lying alongside and adjacent said base tube.

6. In a temperature resistant pressure regulator: a high pressure conduit and a low pressure conduit; a base tube connected between said conduits; a valve in said high pressure conduit, said valve being arranged to close responsive to a predetermined force in said tube; means responsive to fluid pressure connected to said valve and said base tube and a heat exchanger lying parallel to and adjacent one side of said base tube and associated with said means responsive to fluid pressure, whereby said valve is closed at a predetermined fluid pressure within said base tube.

7. In a temperature resistant pressure regulator: a base tube; a high and a low pressure conduit connected to said tube; a valve in said high pressure conduit; adjustable means urging said valve to open; means transmitting closing fluid pressure from said tube to said valve in opposition to said adjustable means and a heat exchanger lying parallel to and adjacent one side of said base tube and associated with said fluid pressure transmitting means, whereby to overcome the action of said adjustable means at a predetermined fluid pressure within said tube.

8. In a pressure regulator: a base tube; a high pressure conduit connected thereto; a valve in said high pressure conduit, said valve being operated responsive to two opposed forces, one a spring exerting an opening force on said valve, the other a pressure responsive element connected to said valve; means transmitting fluid pressure from said tube to said pressure responsive element and heat radiating means associated with said means transmitting pressure, said heat radiating means lying parallel to and adjacent one side of said base tube, whereby a closing force is exerted on said valve by said element in response to said pressure.

9. In a temperature resistant pressure regulator: a conduit conveying fluid under pressure; valve means connected to said conduit and controlling fluid flow therein, a base tube connected to said conduit on the down stream side of said valve means; means responsive to the fluid pressure on the downstream side of said valve means and operatively connected to said valve means, whereby fluid flow through said conduit is controlled by said downstream fluid pressure; and heat exchange means associated with said means responsive to fluid pressure and lying parallel to and adjacent one side of said base tube, whereby the effect of the temperature of said fluid stream on said means responsive to fluid pressure is reduced.

10. In a temperature resistant pressure regulator: a high pressure conduit; a low pressure conduit; a base tube one end of which is connected to said low pressure conduit; a valve device including a valve rod and a duct connecting said base tube with said high pressure conduit, said duct having a valve seat; adjustable means urging said valve rod to open the valved passage; a fluid pressure duct one end of which is connected to said base tube; means cooperative with said pressure duct for transmitting closing fluid pressure to said valve rod in opposition to said adjustable means; and a heat exchanger cooperative with said pressure duct and lying parallel to and adjacent one side of said base tube.

ALEXANDER BOYNTON.